United States Patent
Koochaki et al.

(10) Patent No.: US 12,481,073 B2
(45) Date of Patent: Nov. 25, 2025

(54) APPARATUS INTEGRATING A GNSS ANTENNA, GNSS SPLITTER, AND A WIFI ANTENNA

(71) Applicant: Norsat International Inc., Richmond (CA)

(72) Inventors: Mansour Koochaki, North York (CA); Tong Li, Aurora (CA)

(73) Assignee: Norsat International Inc., Richmond (CA)

( * ) Notice: Subject to any disclaimer, the term of this patent is extended or adjusted under 35 U.S.C. 154(b) by 368 days.

(21) Appl. No.: 18/091,873

(22) Filed: Dec. 30, 2022

(65) Prior Publication Data

US 2024/0219580 A1    Jul. 4, 2024

(51) Int. Cl.
  *G01S 19/36*    (2010.01)
  *G01S 19/37*    (2010.01)

(52) U.S. Cl.
  CPC .............. *G01S 19/36* (2013.01); *G01S 19/37* (2013.01)

(58) Field of Classification Search
  None
  See application file for complete search history.

(56) References Cited

U.S. PATENT DOCUMENTS

| | | | | |
|---|---|---|---|---|
| 2,731,055 A | * | 1/1956 | Smith .................. | E04H 15/22 52/2.17 |
| 5,654,717 A | * | 8/1997 | Nichols ................ | H01Q 9/32 342/357.31 |
| 2010/0067595 A1 | * | 3/2010 | Feher .................. | H04L 27/0008 370/352 |
| 2011/0291882 A1 | * | 12/2011 | Walsh ................. | G01S 19/46 342/464 |
| 2017/0350987 A1 | * | 12/2017 | Morford ............... | G01S 19/51 |

FOREIGN PATENT DOCUMENTS

| CN | 105529517 A | * | 4/2016 | .............. H01P 5/12 |
|---|---|---|---|---|
| CN | 209200123 U | * | 8/2019 | ............. H01P 1/213 |
| CN | 209387879 U | * | 9/2019 | ............. G01S 19/13 |

OTHER PUBLICATIONS

"Who We Are: Our Brands," no author given; published by the Wi-Fi Alliance' Austin, TX, USA; copyright in the year 2024; posted on the Internet at wi-fi.org. (Year: 2024).*

B. Levitan et al, "GPS Systems: Technology, Operation, and Applications" (3rd edition); published by DiscoverNet Publishing; Cary, NC, USA, in the year 2016; ISBN 978-193281319-7; pp. 4-6. (Year: 2016).*

* cited by examiner

*Primary Examiner* — Bernarr E Gregory
(74) *Attorney, Agent, or Firm* — Nexus Law Group LLP; Nicholas Toth; Otto Zsigmond (57) ABSTRACT

An active GNSS splitter module is integrated into a GNSS and WIFI combination antenna to provide four equal GNSS outputs. Different components of this antenna have been optimally placed in the limited available space under a low-profile radome to minimize the mutual effects on the radiation pattern of the antennas. The special compact design of the splitter board allows it to be effectively shielded to mitigate the unintended couplings between the GNSS antenna and the splitter itself. The splitter has an internal amplifier to compensate for the loss of split and output cables. All GNSS output ports are DC pass and therefore the required DC power for the GNSS antenna can be supplied through any of these ports. The splitter is equipped with a DC select circuit which monitors all DC inputs and selects one of them to power the GNSS antenna and splitter itself.

19 Claims, 6 Drawing Sheets

APPARATUS INTEGRATING A GNSS ANTENNA, GNSS SPLITTER, AND A WIFI ANTENNA

BACKGROUND OF THE INVENTION

1. Technical Field

This invention generally relates to the field of transit and vehicle-mounted antennas, and more particularly, to integration of a combination of a global navigation satellite system (GNSS) antenna, and a WIFI antenna, and a GNSS splitter to provide four equal outputs for the GNSS antenna.

2. Description of Related Art

There are a wide range of GNSS applications, such as navigation systems, timing reference for BTS and data centers, DAS networks, manufacturing test labs, etc., where multiple GNSS receivers may be used in one system. Each receiver needs to connect to an antenna to receive the GNSS signal. The GNSS splitters enable multiple GNSS receivers to share a single GNSS antenna which results in reducing the cost of using multiple antennas and the required installation space on the roof.

Although standalone GNSS splitters reduce the cost and the required space on the roof by eliminating extra antennas, the user still needs to find a place indoor to install the splitter and pays for the cost of both the splitter and antenna. Also, usually a long cable is required to be run to connect the antenna mounted on the roof to the indoor installed splitter. This cable introduces more signal loss and may increase the installation cost.

Wi-Fi® is a registered trademark of the Wi-Fi Alliance. The term WIFI is used herein to indicate that a referenced system, device, or component is compliant with one or more of the Institute of Electrical and Electronics Engineers (IEEE) standards 802.11x.

SUMMARY

To address the above-mentioned problems, the present invention provides a cost-effective and easy-to-install solution by integrating an active GNSS antenna, a WIFI antenna and an active GNSS splitter under a low-profile radome enclosure. In this way, the received signal by the embedded GNSS antenna can be shared between up to four different receivers without the need to install an indoor standalone GNSS splitter.

There are two main technical challenges regarding this integration, which are mainly caused by the limited available space under the low-profile radome. First, the radiation characteristics of each antenna can be affected by the other components, including the other antenna, the splitter board and the structures used to mount the splitter board and antennas. Second, unintended coupling through the air from the splitter board to the GNSS antenna can make a closed loop and result in the instability of both the GNSS antenna and splitter board.

To overcome the first challenge some design considerations have been taken into account in terms of placement and shape factor of the components. In conventional designs, the GNSS antenna is placed at the center of the base plate to provide a symmetrical ground for the GNSS antenna. In this design, the GNSS antenna is moved from the center and placed further from the WIFI antenna to reduce the mutual effects on antennas' radiation patterns. The maximum allowable movement from the base plate's center for the GNSS antenna, to the extent that it doesn't affect its pattern characteristics, has been calculated through some simulations and measurements. The WIFI antenna has been placed where it causes the minimum degradation effects on the antennas' radiation pattern. The optimum location of the antenna is obtained through a series of full-wave simulations. The low-profile GNSS antenna has been placed high enough to avoid being shadowed by the WIFI antenna. The compact design of the splitter board allows it to fit in a small area under the GNSS antenna to minimize the effects of its structure on the WIFI pattern characteristic.

To provide a solution for the second challenge, the RF section of the splitter module is implemented on one side of the splitter board. This side is shielded efficiently to limit the unintended couplings between the antenna and the splitter board. Moreover, to ensure a high level of isolation between GNSS ports, double-shielded cables have been used, and the cable connection to the splitter board has been shielded effectively using some modified cable terminations.

Regarding the power splitting function, while the WIFI signal directly comes out of the enclosure through a cable, the GNSS signal is divided between the four GNSS output cables by the integrated splitter board. The split loss and the cables loss are compensated by the splitter's internal amplifier.

The active GNSS antenna and internal amplifier can be powered by any of the GNSS ports that is connected to a GNSS receiver device. The splitter board has a DC select circuit which monitors the DC voltage of all GNSS output ports. If the voltage on the first GNSS port is within the valid range of 3 V to 16 V, this port will be selected to power the GNSS antenna and integrated splitter board. If the DC voltage on the selected port is removed or falls out of the valid range, the DC bias select circuit will automatically select the next port in numerical order to power the antenna and splitter itself and therefore maintain the whole system operational.

While one of the GNSS ports is chosen to power the antenna, other GNSS ports are connected to the ground through the 200 Ohm resistive loads to simulate the antenna current draw for the connected receivers and prevent the false antenna alarm on the receiver side.

If the GNSS antenna fails to draw current, all four GNSS ports will be disconnected from the resistive loads. In this condition, the current draw of each port drops significantly to less than 1 mA, which indicates an antenna fault alarm to receivers.

In accordance with one aspect of the invention, there is provided an apparatus for wireless communications. The apparatus includes a GNSS and WIFI combination antenna integrated with an active wide-band GNSS splitter under a radome enclosure.

The combination antenna may include one or more of a GNSS antenna, a WIFI antenna, and the GNSS splitter. Components of the combination antenna may be optimally placed to minimize the mutual effects on the radiation pattern of the GNSS antenna and the WIFI antenna. The GNSS Antenna, the WIFI antenna and the GNSS splitter may be optimally placed to minimize the mutual effects on the radiation pattern of the GNSS antenna and the WIFI antenna. The WIFI antenna may be a dual-band WIFI antenna. The dual-band WIFI antenna may have a small size. The dual-band WIFI antenna may be placed in an optimum location. The combination antenna may include an output cable. The combination antenna may include five output cables. The output cable may be a WIFI cable. The output cable may be a GNSS cable. The output cables may include four GNSS cables. The output cables may include one WIFI cable and four GNSS cables. The WIFI antenna may be directly connected to the WIFI output cable. The GNSS antenna may have a GNSS antenna output. The GNSS splitter may include an active GNSS splitter input port. The GNSS antenna output may be connected to the active GNSS splitter input port. The GNSS splitter may include four active GNSS splitter output ports. The four active GNSS splitter output ports may be connected to the four GNSS output cables. The GNSS antenna may include a snap-on connector. The snap-on connector may make the GNSS antenna swappable. The GNSS antenna may be swappable during the manufacturing process. The GNSS antenna may be a single-band antenna. The GNSS antenna may be a multi-band antenna. The GNSS antenna may be a wideband antenna. Any one or more of the single-band antenna, the multi-band antenna, and the wideband antenna may be swappable. The GNSS antenna may be swappable without changing other parts of the apparatus. Each of the four GNSS splitter output ports may be DC pass. Each of the GNSS splitter output ports may be operable to supply the required DC power for the active GNSS antenna and active GNSS splitter. The active GNSS splitter may be compact. The active GNSS splitter may be dimensioned to fit into a small area under the GNSS antenna. The effect of the presence of the GNSS splitter on the performance of the GNSS antenna may be reduced. The effect of the presence of the GNSS splitter on the performance of the WIFI antenna may be reduced. The effect of the presence of the GNSS splitter on the performance of both the GNSS antenna and the WIFI antenna may be reduced. The active GNSS splitter may include two main sections. The main sections may include an RF section. The main sections may include an electronic section. The two main sections may be the RF section and the electronic section. The RF section may be located on one side of the GNSS splitter. The RF section may be shielded. The RF section may be shielded efficiently. The RF section may be operable to amplify the GNSS antenna signal. The RF section may be operable to divides the GNSS antenna signal equally between the four GNSS output ports. The electronic section may include a DC select circuit. The electronic section may include a current monitor circuit. The electronic section may be operable to perform any one or more of the following functions: (a) Monitoring the DC input voltages on all four GNSS output ports; (b) Selecting the port with the lowest port number whose DC voltage is within a specified valid range to power the GNSS antenna and a splitter board of the GNSS splitter; (c) If the selected DC input voltage is removed or falls out of the valid range, selecting the next valid DC input in numerical order to power the GNSS antenna and the splitter board; (d) Monitoring the current drawn by the GNSS antenna; and (e) Communicating an indication of an antenna fault to one or more connected receivers in response to the GNSS antenna failing to draw sufficient current such that the current draw of each GNSS port is significantly low. The RF section may include three splitters operable to divide the GNSS signal between four output ports. The RF section may include an RF amplifier operable to amplify the GNSS signal to compensate for the split loss and output cables loss. The RF section may include an attenuator at each output branch. Each attenuator may be operable to provide high isolation between output ports in electrical communication with the each attenuator. One or more of the attenuators may be exchangeable. Each attenuator may have associated therewith an attenuation value. The attenuation value may be calculated. The attenuation value may be selected to compensate for the loss of the output cables. The output cables may have various customized lengths. The attenuation values may be customized to the various losses of the output cables having various customized lengths. The RF section may include a GNSS antenna port operable to receive an input GNSS signal. The RF section may include a first bias tee. The first bias tee may be operable to mix the DC voltage and the RF signal at the GNSS antenna port. The RF section may include four GNSS output ports. The RF section may include four output-port bias tees. The output-port bias tees may be operable to respectively separate the DC voltage from the RF signal at corresponding GNSS output ports. The electronic section may include a prioritizer IC (Integrated Circuit). The electronic section may include two prioritizer ICs. The prioritizer ICs may be operable to monitor four DC input voltages. The prioritizer ICs may be operable to select one of the DC input voltages. The prioritizer ICs may be operable to connect the selected DC input voltage to a DC output of the electronic section. The electronic section may include a back-to-back P-Channel MOSFET (Metal-Oxide-Semiconductor Field-Effect Transistor). The back-to-back P-Channel MOSFET may be disposed on any one of the four DC input paths. The back-to-back P-Channel MOSFET may include a gate controlled by the prioritizer ICs. The prioritizer IC may be operable to control the gate to connect the selected DC input to the DC output of the electronic section. Each DC input may be connected to electrical ground through a resistive load and a N-Channel MOSFET electrically connected to the resistive load in series. The resistive load and the N-Channel MOSFET may be operable to cause an antenna current draw. The antenna current draw may simulate the connection of a receiver to the GNSS antenna port when the GNSS antenna port is not being selected to power the GNSS antenna. The electronic section may include a comparator. The electronic section may include two comparators. The electronic section may be operable to employ the comparator to monitor an output current. The electronic section may be operable to determine the output current by determining a voltage drop across a current sense resistor disposed at an output of the electronic section.

DETAILED DESCRIPTION

The embodiments of the present invention are described in detail with reference to the figures.

Figure 1:
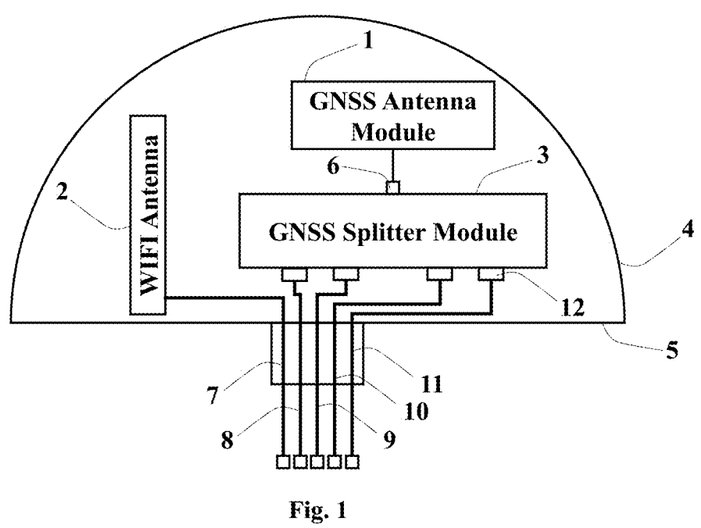
FIG. 1 illustrates the block diagram of the combination antenna.

The block diagram of the combination antenna has been illustrated in FIG. 1. This antenna consists of an active high-performance GNSS antenna 1, a small size dual-band WIFI antenna 2, and a wideband active GNSS signal splitter 3 all mounted on a circular base plate 5 and enclosed in a low-profile radome 4. The WIFI antenna 2 is connected to the WIFI output cable 7, which directly comes out of the radome enclosure 4. The GNSS antenna 1 is connected to the antenna port of the GNSS splitter 3 through a small snap-on connector 6. This type of connection allows the GNSS antenna 1 to be changed easily and quickly during the manufacturing process to deliver single, multi and wideband products without a need to change the other parts. The splitter 3 divides the GNSS signal between four GNSS output cables 8, 9, 10, and 11. To ensure a high level of isolation between GNSS output ports, the GNSS output cables 8, 9, 10, and 11 are chosen of double-shielded type and connected to the splitter board using four modified cable terminations 12.

Figure 2:
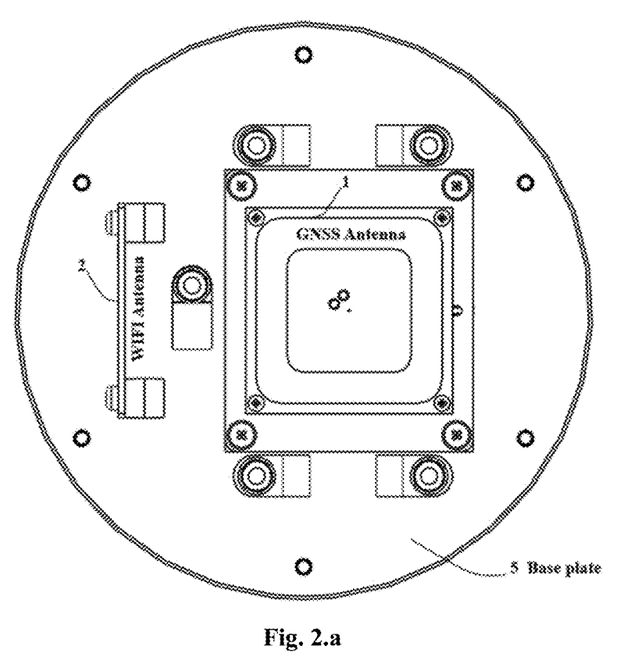
FIGS. 2a and 2b are top and side views of the combination antenna, showing the optimum placement of different components to minimize the mutual effects on the radiation pattern of the antennas.

The top and side views of the combination antenna are shown in FIGS. 2a and 2b, demonstrating the placement of different components, including the GNSS antenna 1, the WIFI antenna 2 and the splitter module 3 on the circular base plate 5. The placement of the components has been optimized to minimize the mutual effects on the radiation pattern of the antennas. For this purpose, first, the center of the GNSS antenna 1 is placed 11 mm away from the center of the base plate 5, which has the diameter of 140 mm. This amount of displacement is the maximum horizontal displacement of the GNSS antenna 3 from the center of the base plate 5 that doesn't degrade the GNSS antenna 3 pattern characteristics. In variations of embodiments, the center-to-center distance of the GNSS antenna 1 and the base plate 5 may be less than 11 mm.

Figure 3:
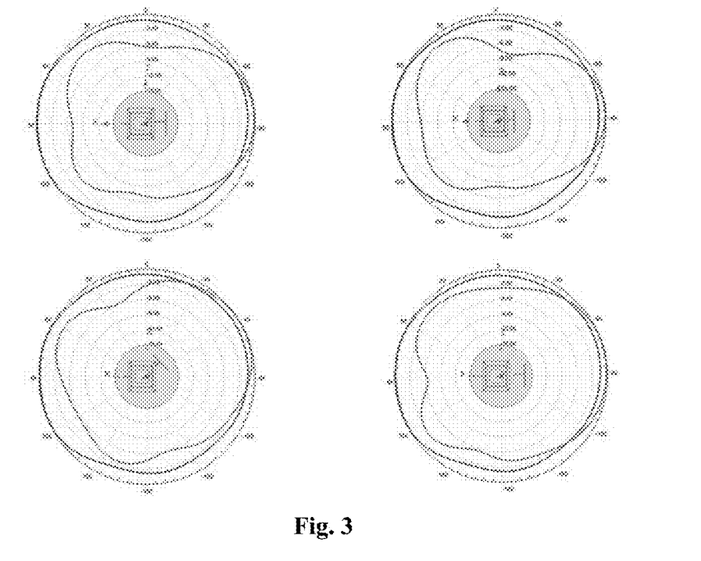
FIG. 3 shows the simulation results for the radiation pattern of the WIFI antenna in different locations on the base plate, used to find the best place to mount the WIFI antenna.

In the next step, the optimal location of the small size WIFI antenna 2 is achieved by a series of simulations, compromising between the VSWR response of the WIFI antenna 2 and radiation pattern characteristics of both GNSS and WIFI antennas 1, 2. The summary of these simulation results is shown in FIG. 3. Based on these results, the WIFI antenna is placed 43 mm away from the base plate's center and parallel to the GNSS antenna 3 such that the WIFI antenna and the GNSS antenna are equidistant from each other along their respective closest sides. The GNSS antenna 3 is mounted at the height of 30 mm above the base plate 5 using a mounting structure to avoid it being shadowed by the WIFI antenna 2. In the illustrated embodiment, the height of 30 mm is the smallest height that minimizes shadowing of the GNSS antenna 3 by the WIFI antenna 2. In variations of embodiments, a height greater than 30 mm may be suitably employed.

Figure 4:
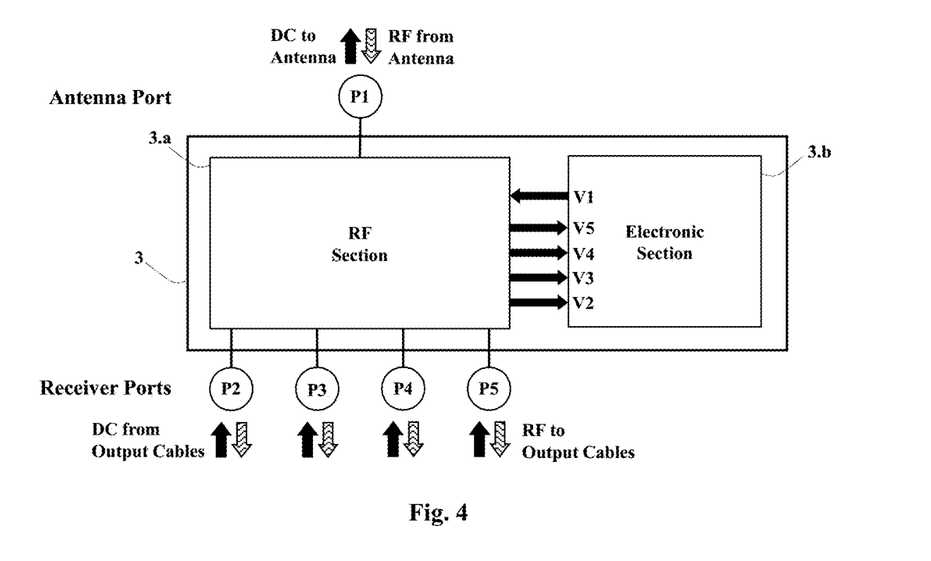
FIG. 4 demonstrates the high-level block diagram of the GNSS splitter board.

FIG. 4 demonstrates the high-block diagram of the GNSS splitter board 3. The splitter board consists of two sections, including an RF section 3.a and an electronic section 3.b. The input GNSS signal to the antenna port of the splitter (port 1) is amplified and divided between four receiver ports 2~5 by the RF section 3.a. In electronic section 3.b a DC select circuit monitors and selects one of the input DC voltages on receiver ports 2~5 (V2 to V5) and connects it to the V1 output of this section to power the GNSS antenna and splitter's internal circuit. Port 2 has the highest priority. If the DC voltage on this port is within a specified range of 3 V to 16 V, this port will be selected to power the antenna and splitter's internal circuit. If the DC voltage on this port is removed or falls out of range, the next port in numerical order will be selected to power the antenna and splitter itself.

Figure 5:
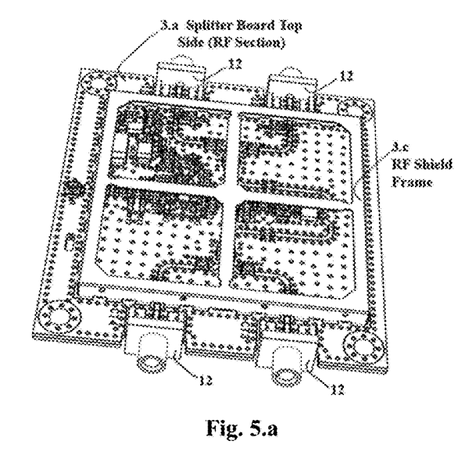
FIGS. 5a and 5b shows the top and bottom sides of the splitter board.

The splitter board 3 is implemented compactly on a 68*60 mm two-sided PCB to be able to fit it in the limited area under the GNSS antenna and reduce the effects of this board and its mounting structure on the performance of the antennas. FIGS. 5a and 5b show the top and bottom sides of the splitter board 3. While the electronic section 3.b is implemented on the bottom side, all RF section parts and routes 3.a are placed on the top side to be able to be shielded efficiently by using an RF shield cabinet 3.c. This shield limits the unintended coupling from the splitter board 3 to the GNSS antenna 1, ensuring the stable performance of the internal amplifiers of both the GNSS 1 antenna and splitter board 3.

Figure 6:
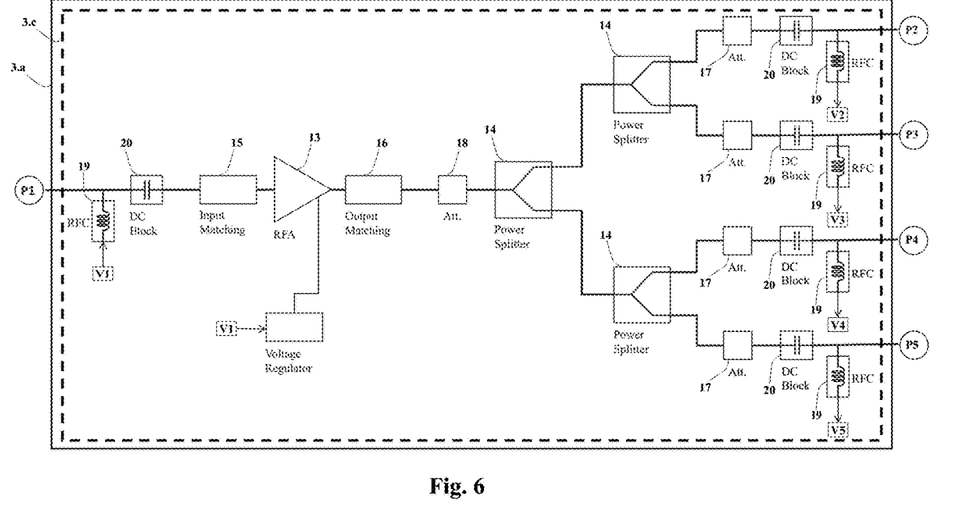
FIG. 6 depicts the block diagram of the splitter's RF section.

The block diagram of the splitter's RF section has been depicted in FIG. 6. The input GNSS signal to port 1 is amplified by the RF amplifier 13 and divided between four output ports 2~5 through the three identical splitters 14. As can be seen in FIG. 6, each splitter 14 is a one-to-two splitter that splits its input signal into two it signals. The two outputs of the first splitter 14 is connected to the inputs of the second and third splitters 14, respectively, such that the three splitters 14 split the input GNSS signal into a total of four output GNSS signals as shown in FIG. 6. The amplifier is matched over the frequency range by the two matching circuits at its input 15 and output 16. High isolation between output ports is achieved by using a fixed attenuator 17 at each output branch. The value of these attenuators is calculated based on the output cable length to compensate for the cable loss and maintain the total gain of 0 dB for all four paths. Another fixed attenuator 18 at the first splitter input helps to improve the amplifier matching and adjust the total gain. At each port, there is a bias tee circuit consisting of an RFC inductor 19 and DC block capacitor 20. At ports 2~5, the bias tee separates the DC voltage from the RF signal and sends it to the electronic section 3.b. At port 1, the bias tee receives the selected DC voltage from the electronic section and combines it with the RF signal.

Figure 7:
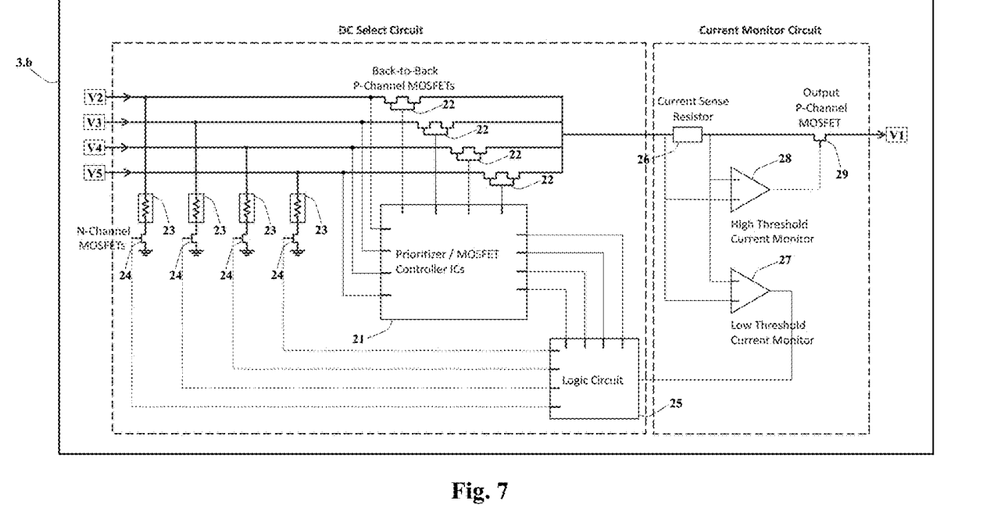
FIG. 7 depicts the block diagram of the splitter's electronic section.
Figure 8:
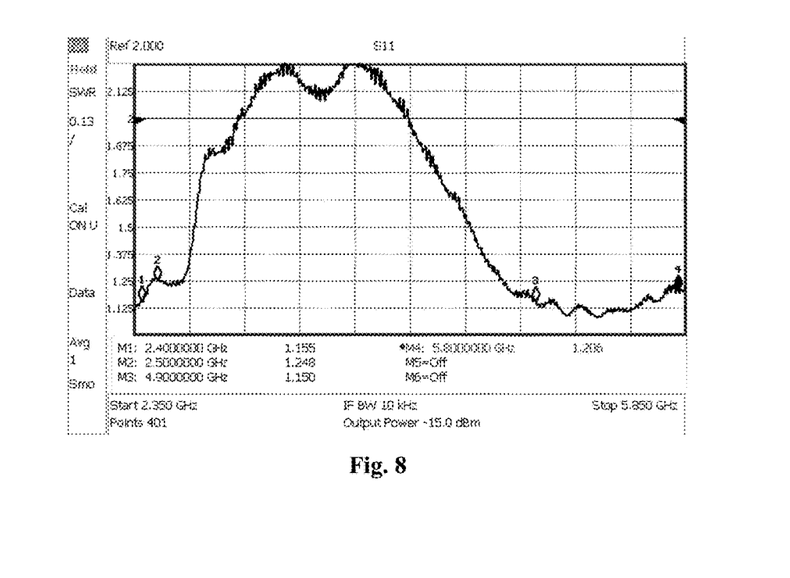
FIG. 8 shows the VSWR response of the WIFI port.
Figure 9:
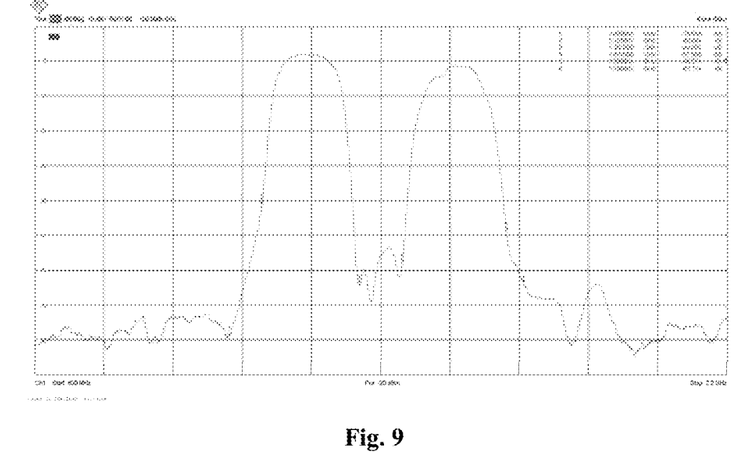
FIG. 9 shows the out-of-band rejection of the GNSS ports.

FIG. 7 depicts the block diagram of the splitter's electronic section 3.b. In this section, two prioritizer ICs 21 monitor the level of four input DC voltages (V2~V5) from ports 2~5. If the first DC voltage (V2) is within the valid range of 3 V to 16 V, the prioritizer pulls down the gate of the back-to-back P-Channel MOSFET 22 in path V2 while the gates of MOSFETs in the other paths are pulled up. As a result, the V2 input is connected to the output (V1), and the other inputs are disconnected. If V2 falls out of the valid range, the gate of the MOSFET 22 in path V2 will be pulled up and instead, the gate of the MOSFET 22 in path V3 will be pulled down. As a result, V2 will be disconnected from the output and instead, V3 will be connected to the output. If V3 fails, the next input voltage will be connected to the output (V1) and so on.

While one of the input voltages, for example V2, is connected to the output, the antenna draws an amount of current from the receiver connected to this input. Other inputs (V3 to V5) are disconnected from the output. So, there is no current draw from the receivers connected to these inputs. Some receivers may raise an antenna fault alarm when there is no current draw from their ports. To avoid this false alarm and provide the current draw from receivers which are not connected to the output, the inputs related to these receivers will be pulled down through 200-ohm resistors 23. These resistors are connected to the ground through N-Channel MOSFETs 24, which their gates are controlled by the logic circuit 25 based on the status of the paths provided by the prioritizer ICs 21. As can be seen in FIGS. 6-7, there is one resistor 23 in series with one N-Channel MOSFET 24 that are connected between each GNSS output port 2~5 and electrical ground.

Output current is monitored by reading the drop voltage across the current sense resistor 26 using two comparators 27, 28. If the antenna disconnects or an open circuit occurs, the logic circuit 25 will be informed through the output of the low threshold current monitor comparator 27. In this state, the logic circuit 25 makes the gate of all N-Channel MOSFETs 24 low to disconnect the 200-ohm input resistors 23 from the ground. As a result, there is no current draw from any receiver ports. In this way, the splitter 3 indicates to all receivers that the GNSS antenna is not connected.

If the output current exceeds a specified high threshold, the output voltage will be reduced to provide short circuit protection. This function is applied by controlling the gate of output P-Channel MOSFET 29 through the high threshold current monitor comparator 28.

What is claimed is:

1. An apparatus for wireless communications, the apparatus comprising: (a) a first antenna module comprising a Global Navigation Satellite System (GNSS) type antenna for receiving an input GNSS signal; (b) a second antenna module comprising a WIFI antenna; (c) a splitter module comprising three GNSS-type splitters for splitting the input GNSS signal into four output GNSS signals; and (d) a radome enclosure dimensioned for enclosing the first antenna module, the second antenna module, and the splitter module.

2. The apparatus of claim 1 wherein the first antenna module is mounted on and spaced-apart from a base plate defining a base-plate center, a center of the first antenna module being laterally displaced away from the base-plate center.

3. The apparatus of claim 2 wherein the splitter module is mounted on and spaced-apart from the base plate, the splitter module being disposed between the base plate and the first antenna module such that the splitter module fits under the first antenna module.

4. The apparatus of claim 3 further comprising a splitter board disposed between the base plate and the first antenna module, the splitter module comprising a radio-frequency (RF) section disposed on a first side of the splitter board, the apparatus further comprising a shield attached to the splitter board on the first side of the splitter board for limiting RF coupling between the splitter board and the GNSS type antenna.

5. The apparatus of claim 4 wherein the splitter module further comprises an electronic section disposed on a second side of the splitter board opposite the first side of the splitter board.

6. The apparatus of claim 1 wherein the splitter module is active and comprises a RF amplifier for amplifying the input GNSS signal to compensate for split loss and output cables loss.

7. The apparatus of claim 6 further comprising four GNSS output ports for outputting the four output GNSS signals, respectively, the apparatus further comprising four attenuators for attenuating the four output GNSS signals and for providing isolation between the four GNSS output ports, respectively.

8. The apparatus of claim 7 wherein the attenuators are exchangeable.

9. The apparatus of claim 7 wherein each said GNSS output port is direct-current (DC) pass, the splitter module being operable to receive DC power from any one of the four GNSS output ports.

10. The apparatus of claim 9 wherein the splitter module comprises four output-port bias tees operable to receive the DC power from said any one of the four GNSS output ports, respectively.

11. The apparatus of claim 7 wherein the splitter modules comprises four output cables at the four GNSS output ports, respectively.

12. The apparatus of claim 1 wherein the first antenna module is connected via a snap-on connector.

13. The apparatus of claim 1 further comprising a WIFI output cable directly connected to the WIFI antenna.

14. The apparatus of claim 1 wherein said three GNSS-type splitters comprise first, second, and third one-to-two splitters, each one-to-two splitter of the first, second, and third one-to-two splitters defining one input and two outputs, the two outputs of the first one-to-two splitter being connected to the inputs of the second and third one-to-two splitters, respectively.

15. The apparatus of claim 1 further comprising four GNSS output ports for outputting the four output GNSS signals, respectively, and wherein the splitter module comprises an electronic section operable to perform the following functions:
   a. Monitoring each GNSS output port of the four GNSS output ports for a DC input voltage;
   b. Selecting one GNSS output port of the four GNSS output ports having a lowest port number and having the DC input voltage at the one GNSS output port within a predetermined voltage range;
   c. Selecting a new GNSS output port in numerical order after the DC input voltage at the one GNSS output port is no longer within the predetermined voltage range; and
   d. Monitoring the electrical current drawn by the first antenna module.

16. The apparatus of claim 15 wherein the electronic section defines a DC output, the electronic section comprising two prioritizer integrated circuits (ICs) operable to monitor said each GNSS output port and operable to select said one GNSS output port and said new GNSS output port such that the DC input voltage is connected to the DC output.

17. The apparatus of claim 16 further comprising a back-to-back P-Channel Metal-Oxide-Semiconductor Field-Effect Transistor (MOSFET) comprising a gate that is controlled by the prioritizer ICs to connect the DC input voltage to the DC output.

18. The apparatus of claim 16 further comprising a resistive load and a N-Channel MOSFET electrically connected in series to the resistive load, one said resistive load and one said N-Channel MOSFET being connected between electrical ground and said each GNSS output port, respectively.

19. The apparatus of claim 16 further comprising a current sense resistor and two comparators for monitoring electrical current at the DC output by the two comparators reading a drop voltage across the current sense resistor.

* * * * *